United States Patent
Köfinger et al.

(10) Patent No.: US 8,262,023 B2
(45) Date of Patent: Sep. 11, 2012

(54) AIRCRAFT FRAME ELEMENT CONNECTED TO AN AIR-CONDITIONING SYSTEM

(75) Inventors: Christian Köfinger, Kufstein (AT); Joachim Metzger, Öpfingen (DE); Michael Auburger, Erlenmoos (DE)

(73) Assignee: Airbus Operation GmbH (DE)

( * ) Notice: Subject to any disclaimer, the term of this patent is extended or adjusted under 35 U.S.C. 154(b) by 151 days.

(21) Appl. No.: 12/438,036

(22) PCT Filed: Aug. 17, 2007

(86) PCT No.: PCT/EP2007/007294
§ 371 (c)(1),
(2), (4) Date: Sep. 27, 2010

(87) PCT Pub. No.: WO2008/022752
PCT Pub. Date: Feb. 28, 2008

(65) Prior Publication Data
US 2011/0024561 A1 Feb. 3, 2011

Related U.S. Application Data

(60) Provisional application No. 60/827,318, filed on Sep. 28, 2006.

(30) Foreign Application Priority Data

Aug. 22, 2006 (DE) .......................... 10 2006 039 292

(51) Int. Cl.
*B64C 1/00* (2006.01)
(52) U.S. Cl. ..................... 244/119; 244/118.5; 454/76
(58) Field of Classification Search ............... 244/118.5, 244/119, 117 R, 117 A; 454/70–77
See application file for complete search history.

(56) References Cited

U.S. PATENT DOCUMENTS

| | | | |
|---|---|---|---|
| 2,310,941 A | | 2/1943 | Dewey |
| 4,552,325 A | * | 11/1985 | Bruensicke ............... 244/118.5 |
| 4,726,426 A | * | 2/1988 | Miller ........................ 169/62 |
| 4,739,823 A | * | 4/1988 | Howard ...................... 165/56 |
| 4,819,720 A | * | 4/1989 | Howard ................. 165/104.34 |
| 5,263,665 A | * | 11/1993 | Koneczny et al. ......... 244/117 R |

(Continued)

FOREIGN PATENT DOCUMENTS

DE 102004042080 3/2006

(Continued)

OTHER PUBLICATIONS

PCT International Search Report for PCT/EP2007/007294 completed by the EP Searching Authority on Dec. 18, 2007.

(Continued)

*Primary Examiner* — Tien Dinh
*Assistant Examiner* — Michael A Fabula
(74) *Attorney, Agent, or Firm* — Barnes & Thornburg LLP

(57) ABSTRACT

A frame element for use in an aircraft air-conditioning system is attachable to an aircraft structure and includes at least one strut which is formed to at least in sections as a hollow cylinder, wherein an air inlet connection of the at least one-section-wise hollow cylindrically formed strut of the frame element is connectable to an air outlet duct of an aircraft air-conditioning unit, and an air outlet connection of the at least one section-wise hollow cylindrically formed strut of the frame element is connectable to an air outlet opening terminating in a cabin region of an aircraft.

13 Claims, 8 Drawing Sheets

U.S. PATENT DOCUMENTS

| | | | | |
|---|---|---|---|---|
| 5,423,498 | A * | 6/1995 | Fluegel | 244/117 A |
| 5,556,332 | A * | 9/1996 | Schumacher | 454/76 |
| 5,667,168 | A * | 9/1997 | Fluegel | 244/117 A |
| 5,702,073 | A * | 12/1997 | Fluegel | 244/57 |
| 5,810,178 | A * | 9/1998 | Boette et al. | 211/86.01 |
| 5,897,079 | A * | 4/1999 | Specht et al. | 244/118.5 |
| 6,158,690 | A * | 12/2000 | Wadey et al. | 244/17.27 |
| 6,491,254 | B1 * | 12/2002 | Walkinshaw et al. | 244/118.5 |
| 6,536,710 | B1 * | 3/2003 | Bobzien et al. | 244/119 |
| 7,005,175 | B2 * | 2/2006 | Hachenberg et al. | 428/75 |
| 7,040,575 | B2 * | 5/2006 | Struve et al. | 244/118.5 |
| 7,059,565 | B2 * | 6/2006 | Scown et al. | 244/117 R |
| 7,108,227 | B2 * | 9/2006 | Kunzel et al. | 244/119 |
| 2005/0044712 | A1 * | 3/2005 | Gideon et al. | 29/897.32 |
| 2005/0082431 | A1 * | 4/2005 | Scown et al. | 244/119 |
| 2006/0118676 | A1 * | 6/2006 | Novak et al. | 244/129.1 |
| 2007/0210210 | A1 * | 9/2007 | Shumate et al. | 244/119 |
| 2008/0185479 | A1 * | 8/2008 | Brownjohn et al. | 244/129.3 |
| 2008/0308674 | A1 * | 12/2008 | Frantz et al. | 244/118.5 |
| 2009/0008502 | A1 * | 1/2009 | Lynas | 244/119 |
| 2009/0230244 | A1 * | 9/2009 | Kofinger et al. | 244/118.5 |
| 2009/0272849 | A1 * | 11/2009 | Koefinger et al. | 244/131 |
| 2009/0298408 | A1 * | 12/2009 | Reisbach | 454/76 |
| 2010/0240290 | A1 * | 9/2010 | Markwart et al. | 454/71 |
| 2010/0252684 | A1 * | 10/2010 | Stephan | 244/131 |
| 2011/0024565 | A1 * | 2/2011 | Koefinger et al. | 244/131 |
| 2011/0233336 | A1 * | 9/2011 | Dervault et al. | 244/119 |

FOREIGN PATENT DOCUMENTS

| | | |
|---|---|---|
| EP | 0234056 A | 9/1987 |
| EP | 0234056 A1 | 9/1987 |
| EP | 1510454 A | 3/2005 |
| EP | 1510454 A1 | 3/2005 |
| RU | 2111152 C1 | 5/1998 |
| WO | WO 2005/110843 | 11/2005 |

OTHER PUBLICATIONS

Decision on Granting a Patent for Invention dated Apr. 4, 2011 issued from The Federal Service for Intellectual Property Patents and Trademarks for Application No. 2009107852/11 (010514) (4 pages).

* cited by examiner

AIRCRAFT FRAME ELEMENT CONNECTED TO AN AIR-CONDITIONING SYSTEM

CROSS-REFERENCE TO RELATED APPLICATIONS

This application is a U.S. national counterpart application of international application serial No. PCT/EP2007/007294 filed Aug. 17, 2007, which claims priority to German Patent Application No. 102006039292.2 filed Aug. 22, 2006 and to U.S. Provisional Patent Application No. 60/827,318 filed Sep. 28, 2006.

TECHNICAL FIELD

The present invention relates to a frame element for use in an aircraft air-conditioning system, an aircraft air-conditioning system and a method for the installation of a frame element in an aircraft.

BACKGROUND

In the installation of an air-conditioning system in an aircraft, it is currently normal practice to connect air outlet ducts of an aircraft air-conditioning system to pipelines, so-called riser ducts. The riser ducts extend in the region of an aircraft structure from the air outlet ducts of the aircraft air-conditioning system arranged underneath a passenger cabin, to air outlet openings provided in interior components of the aircraft and terminating in the cabin region of the aircraft. After the riser ducts have been laid the interior components of the aircraft are secured to the aircraft structure and the riser ducts are connected to air outlet openings provided in the interior components. Normally the air outlet openings are located above the seating positions of the aircraft passengers and are therefore formed for example in ceiling panels of the aircraft cabin. Since the riser ducts as well as the interior structural parts have to be individually positioned and mounted, the installation of these components is time-consuming and therefore extremely cost-intensive.

In order to simplify the installation of riser ducts in an aircraft EP 1 510 454 A1 proposes integrating the riser ducts in aircraft interior components, such as for example in side panels. In particular, EP 1 510 454 A1 describes an injection-moulded side panel into which is formed a pipeline that is connectable to an aircraft air-conditioning system. The production of such a side panel is however relatively complicated. Furthermore, the integration of the riser ducts in the side panel requires a corresponding matching of the construction parameters, such as for example the cross-section of the side panel.

SUMMARY

The object of the invention is to provide a frame element for use in an aircraft air-conditioning system, an aircraft air-conditioning system and a method for the installation of a frame element in an aircraft, which permit a simple and quick installation of the riser ducts in the aircraft.

In order to achieve this object a frame element according to the invention for use in an aircraft air-conditioning system is attachable to an aircraft structure and includes at least one strut that is formed at least section-wise as a hollow cylinder. The hollow cylindrically formed section of the strut or the hollow cylindrically formed strut of the frame element forms a pipeline with an air inlet connection, which is connectable to an air outlet duct of an aircraft air-conditioning system. An air outlet connection of the hollow cylindrically formed strut of the frame element is connectable to an air outlet opening terminating in a cabin region of the aircraft. The use of the frame element according to the invention enables the installation of the riser ducts in the aircraft to be significantly simplified, without necessitating a complicated reshaping of an aircraft interior component.

Preferably the frame element is designed to be screwed to the aircraft structure. For example, the frame element can be fastened to the aircraft structure by means of four screw connections. For this purpose corresponding holes, if necessary provided with a thread, can be provided in the aircraft structure and/or in the frame element.

In order to permit a particularly simple installation of the frame element on the aircraft structure, the frame element may also be designed so that it can be fastened at one end by a socket connection and at the other end by a screw connection or catch connection to the aircraft structure. A frame element designed in this way could also be removed in a particularly simple manner from the aircraft structure. A particularly high ease of installation is achieved if a structural part of the frame element or of the aircraft structure serving for the formation of the socket connection is designed in an articulated manner.

The frame element preferably consists of a light and rigid material, such as for example aluminium, an aluminium alloy, GRP, CRP, or some other carbon fibre material.

Preferably the hollow cylindrically formed strut of the frame element has a closed cross-section. This cross-section is preferably circular or oval, which thereby also permits a simple and cost-beneficial production of the frame element.

In a preferred embodiment of the invention the frame element includes at least one longitudinal strut, which is formed at least section-wise as a hollow cylinder. The frame element may also include two longitudinal struts, which both are formed at least section-wise as a hollow cylinder, so that both longitudinal struts of the frame element can be used as riser ducts which are connectable to air outlet ducts of the aircraft air-conditioning system. Alternatively or in addition to the utilisation of the at least section-wise hollow cylindrically formed strut of the frame element as a riser duct, it is also conceivable to use the at least section-wise hollow cylindrically formed strut of the frame element as a cable duct. For example, it is conceivable to utilise one hollow cylindrically formed longitudinal strut of the frame element according to the invention as a riser duct, and to use one hollow cylindrically formed longitudinal strut of the frame element as a cable duct. If the cross-sectional size is sufficient, it is however also possible to use the hollow cylindrically formed strut of the frame element simultaneously as a riser duct and a cable duct. Furthermore it is also possible to run a cable along the outside of the strut.

The length of the longitudinal struts of the frame element may be varied depending on requirements. In this way the geometry of the frame element can also be varied as desired. For example, the frame element can extend from a plane forming the floor of an aircraft cabin, up to a centre line of the aircraft cabin ceiling. Alternatively it is also conceivable for a frame element to extend from one side of the plane forming the floor of an aircraft cabin to the opposite side of the plane forming the floor of an aircraft cabin, i.e. to span both sides of the aircraft cabin as well as the aircraft cabin ceiling. The air inlet connection and the air outlet connection of the at least section-wise hollow cylindrically formed longitudinal strut each may be provided at the ends of the longitudinal strut. It is however also possible to provide the air inlet connection and/or the air outlet connection at an arbitrary position along the length of the at least section-wise hollow cylindrically formed longitudinal strut. Obviously a plurality of air inlet connections and/or air outlet connections may also be provided along the length of the at least section-wise hollow cylindrically formed longitudinal strut.

In the installed state of the frame element the longitudinal struts of the frame element may extend parallel to ribs of the aircraft structure. The longitudinal struts therefore preferably have at least section-wise a curvature that matches a curvature of the ribs of the aircraft structure.

According to a preferred embodiment of the invention the frame element further comprises at least one connecting strut extending between two longitudinal struts. Depending on the length of the longitudinal struts the frame element may include a corresponding number of connecting struts, so as to ensure a sufficient rigidity of the frame element. The at least one connecting strut of the frame element may be designed at least section-wise as a hollow cylinder, so that the hollow cylindrically formed section of the connecting strut or the hollow cylindrically formed connecting strut is connectable to an air outlet duct of an aircraft air-conditioning system and an air outlet opening terminating in a cabin region of the aircraft.

For example, the frame element may be dimensioned so that the longitudinal struts in the installed state of the frame element extend substantially parallel to adjacent ribs of the aircraft structure. Alternatively to this, the frame element may however be of such a size that the distance of the longitudinal struts from one another is greater than the distance between two adjacent ribs of the aircraft structure. In this case the connecting strut of the frame element is preferably provided with at least one recess, which after the attachment of the frame element to the aircraft structure co-operates with a rib of the aircraft structure in such a way that the rib is accommodated in the recess provided in the connecting strut. The rib arranged between the longitudinal struts of the frame element in the installed state of the frame element is thereby prevented in a simple manner and way from interfering in the fastening of the frame element to the aircraft structure. If the frame element includes a plurality of connecting struts, then preferably each connecting strut is provided with at least one recess, which in the installed state of the frame element accommodates a rib of the aircraft structure. In a particularly preferred embodiment of the frame element according to the invention all connecting struts of the frame element comprise two recesses for accommodating two adjacent ribs.

Preferably at least one force application device, designed for example in the shape of a clip, is formed on the frame element for attaching the frame element to the aircraft structure. For example, at least one force application device may be provided on each longitudinal strut of the frame element, through which a screw or a bolt can be guided, so as to connect the frame element in a simple and reliable manner to the aircraft structure. Depending on the size of the frame element and the length of the longitudinal struts, respectively, a plurality of force application devices may also be formed on the frame element for attaching the frame element to the aircraft structure.

For example, a plurality of force application devices may be arranged distributed along the length of the longitudinal struts of the frame element, so as to ensure a reliable fastening of the frame element to the aircraft structure. The important point is simply that the force application devices do not interfere in the connection of the air inlet and air outlet connections of the at least section-wise hollow cylindrically formed longitudinal strut or struts of the frame element to the air outlet duct of the aircraft air-conditioning system and the air outlet opening terminating in the cabin region of the aircraft, respectively.

In a preferred embodiment of the invention the frame element is attachable to the aircraft structure via shock mounts. Shock mounts are understood here to mean bearings that consist of a vibration-damping material, for example a rubber-elastic material, and ensure a shock-free fastening of the frame element, and thus of the interior structural part attached to the frame element, to the aircraft structure. An acoustic decoupling of the frame element from the aircraft structure is effected by the fastening of the frame element via shock mounts. The shock mounts may for example be positioned between the force application devices formed on the frame element, and the components of the aircraft structure, such as for example the ribs, which are provided for the fastening of the frame element. It is however possible to provide all the fastening devices described above for the fastening of the frame element to the aircraft structure with corresponding shock mounts for the acoustic decoupling of the frame element from the aircraft structure.

Suitable through openings are preferably provided in the shock mounts, which enable a screw or a bolt to be guided through the shock mounts so as to fasten the frame element to the aircraft structure. As an alternative, suitable elastic bushings may also be provided in the shock mounts for connecting the shock mounts to the frame element.

In the installation of interior components in an aircraft it is normal practice at the present time to connect the various components, such as for example dado panels, side panels, light strips and the like, individually to the aircraft structure. Since each structural part has to be positioned and fastened to the aircraft structure separately, the installation of the interior components is often extremely time-consuming. Furthermore, alterations in the position of individual interior components or also design changes to the interior structural parts can often be effected only with great difficulty, since such changes as a rule require a suitable matching of a holder on the aircraft structure side and/or at least a matching of the fastening points provided on the aircraft structure for the installation of the interior components.

Whereas the primary insulation is fastened directly to the inner face of the aircraft outer shell (skin), the insulation packages forming the secondary insulation of the aircraft are normally bonded to the interior structural parts, before these in turn are fastened to the aircraft structure. In order to reproduce the often curved contour, provided with stepped portions and the like, of the interior components, a plurality of variously shaped insulation packages are often necessary. The installation of the secondary insulation is therefore time-consuming and cost-intensive.

The frame element according to the invention therefore preferably further comprises at least one fastening device for fastening at least one aircraft interior component or at least one insulation package to the frame element. If the frame element according to the invention is used to connect an interior component to the aircraft structure, the interior structural part can first of all be fastened to the frame element. In this case air outlet openings preferably formed in the interior structural part and terminating in the cabin region of the aircraft in the installed state of the structural part, are connected to the corresponding air outlet connections of the at least section-wise hollow cylindrically formed longitudinal struts of the frame element. If desired, a plurality of interior components may of course also be attached to the frame element. The pre-assembled structural group consisting of the frame element with the interior structural part or parts fastened thereon can then be connected in a simple and quick manner to the aircraft structure.

A particular advantage of the frame element according to the invention hence consists in the fact that it can fulfil a double function, and can provide not only the riser ducts for the aircraft air-conditioning system, but can also serve as a carrier element for various interior components, i.e. interior components of various shapes and sizes. Accordingly, the number as well as the arrangement of the fastening points provided on the aircraft structure for the interior components no longer have to match various interior components, but merely have to match a frame element carrying various structural parts. The frame element according to the invention thus enables the fastening points provided on the interior structural parts to be decoupled from the fastening points provided on the aircraft structure. As a result the number of the fastening points provided on the aircraft structure for the interior components can be significantly reduced by the use of the frame element according to the invention. Furthermore, it is possible to standardise the arrangement of the fastening points for the interior components on the aircraft structure.

Since a matching of the fastening points on the interior structural component side and the aircraft structure side can be dispensed with by the use of the frame element according to the invention, an increased flexibility in the design of both the interior components and also the aircraft structure is achieved. This increased flexibility can be utilised to optimise the weight of the interior components and/or of the aircraft structure.

If the frame element according to the invention is used to connect at least one insulation package, forming for example a part of the secondary insulation of the aircraft, to the aircraft structure, then similarly the insulation package can first of all be fastened to the frame element. If desired, a plurality of insulation packages may of course also be attached to the frame element. The pre-assembled structural group consisting of the frame element together with the insulation package or packages secured thereon can then be connected in a simple and quick manner to the aircraft structure. Again, the frame element according to the invention can then fulfil a double function, to provide the riser ducts for the aircraft air-conditioning system and at the same time to act as a carrier element for at least one insulation package.

The complicated and expensive bonding of the insulation packages to the interior structural parts can be dispensed with by the use of the frame element according to the invention in the installation of the insulation packages forming for example the secondary insulation of the aircraft. In particular, compared to most aircraft interior components the frame element has a significantly simpler shaped contour, without stepped portions and the like, which means that fewer individually designed insulation packages have to be employed. Considerable cost savings are thereby possible.

A holder, a clamp or a catch device may be provided on the frame element as fastening device for fastening at least one interior component to the frame element, which can also be designed integrated with the frame element. Alternatively however, it is also possible to screw or rivet the interior component to the frame element, in which case corresponding holes, if necessary provided with a thread, can then be formed in the interior component and/or in the frame element.

A fastening device for fastening at least one insulation package to the frame element is preferably designed so as to fasten the insulation package in a mechanically releasable manner to the frame element.

For example, the fastening device may be designed in the form of a catch-type closure, a Velcro-type strip, a mushroom-type strip or a Christmastree-type fastening device. Alternatively, it is also possible to fasten the insulation package to the frame element with the aid of screws, rivets, clips, clamping devices, magnetic holders, spring-loaded pressure closures, an expansion-type fastening device or a spherical fastening device. Furthermore, it is conceivable to suspend the insulation package on fastening points that are provided on the frame element, or to design the insulation package somewhat larger than the frame element, so as to be able to bend the insulation package around the frame element and to fasten the insulation package by means of a rubber strip to the frame element. Finally, the device for fastening the frame element according to the invention to the aircraft structure can also be designed so that it permits at the same time the fastening of the insulation package to the frame element.

The frame element according to the invention preferably also includes a fastening module, on which the at least one fastening device for fastening at least one aircraft interior component is formed or arranged. As already mentioned, the interior component can be fastened by means of a holder, a clamp or a catch device, but also by screwing or riveting, to the frame element. The holder, clamp or catch device can either be attached to the fastening module, or can be designed integrally with the said fastening module. If the interior component is to be screwed or riveted to the frame element, then corresponding holes, if necessary provided with a thread, may be formed in the fastening module.

The fastening module, which is formed integrally with the frame element but can also be detachably connected to the frame element, matches as regards its shape and size as well as in particular as regards the arrangement of the fastening device, the interior structural part to be attached to the frame element. In order to be able to use the frame element for fastening various interior components to the aircraft structure, the frame element simply needs to be provided with various fastening modules matching the various interior components. In this way even relatively small interior components can for example be fastened to the frame element, with the result that the frame element according to the invention can be used in a particularly flexible manner.

According to a particularly preferred embodiment of the invention the frame element furthermore comprises at least one further fastening device for fastening at least one insulation package or at least one interior component to the frame element. In other words, the frame element is designed so that it can be pre-assembled with at least one interior structural component as well as with at least one insulation package forming for example a part of the aircraft secondary insulation, so as to form an independently manipulable structural group. This structural group can then be attached in a simple way and means, as described above, to the aircraft structure. The frame element is in this connection preferably designed so that the interior component fastened to the frame element is arranged, in the installed state of the structural group consisting of the frame element, the interior component and the insulation package, on a side of the frame element facing away from the aircraft structure. The insulation package may on the other hand in the installed state of the structural group either be arranged on a side, facing towards the aircraft structure, of the frame element between the frame element and the aircraft structure, or may be fastened between the at least one interior component and the frame element on the side of the frame element facing away from the aircraft structure. Corresponding air inlet and air outlet connections of the at least section-wise hollow cylindrically formed longitudinal struts of the frame element are in this case connected to the air outlet openings formed in the interior structural part, which in the installed state of the structural group terminate in the cabin region of the aircraft.

If the frame element according to the invention is intended to be connected to an interior structural part and an insulation package to form a structural group, the fastening devices described above can be used as fastening devices for the interior structural part and the insulation package. In particular, the interior structural part can be fastened to the frame element by means of a holder, clamp, or catch device optionally attached to or formed on a fastening module, and the insulation package can be secured to the frame element by means of a mechanically releasable fastening device, such as for example a Velcro-type closure or an adhesive strip.

An aircraft air-conditioning system according to the invention includes an aircraft air-conditioning unit comprising an air outlet duct, an air outlet opening terminating in a cabin region of an aircraft, and at least one frame element as described above. The air inlet connection of the at least section-wise hollow cylindrically formed strut of the frame element is connected to the air outlet duct of the aircraft air-conditioning unit, and the air outlet connection of the at least section-wise hollow cylindrically formed strut of the frame element is connected to the air outlet opening terminating in the cabin region of the aircraft.

Preferably the aircraft air-conditioning system according to the invention includes a plurality of frame elements. A gap covering is preferably provided between adjacent frame elements of the aircraft component installation system.

A method according to the invention for the installation of a frame element in an aircraft includes the steps of providing a frame element as described above, attaching the frame element to an aircraft structure, connecting an air inlet connection of an at least section-wise hollow cylindrically formed strut of the frame element to an air outlet duct of an aircraft air-conditioning unit, and connecting an air outlet connection of the at least section-wise hollow cylindrically formed strut of the frame element to an air outlet opening terminating in a cabin region of the aircraft.

The frame element may be attached to the aircraft structure in such a way that a recess provided in a connecting strut of the frame element accommodates a rib of the aircraft structure.

The frame element is preferably attached to the aircraft structure by means of a force application device formed on the frame element, wherein such a force application device may be provided on each longitudinal strut of the frame element.

The frame element may be attached to the aircraft structure via shock mounts.

In a preferred embodiment of the method according to the invention, at least one interior component or at least one insulation package is fastened to the frame element preferably before the attachment of the frame element to the aircraft structure. If the method envisages the fastening of an interior component to the frame element, then in this case an air outlet opening formed in the interior component and terminating in the installed state of the component in the cabin region of the aircraft, is connected to a corresponding air outlet connection of the at least section-wise hollow cylindrically formed longitudinal strut of the frame element.

The at least one interior component can be secured to the frame element by means of a fastening device designed in the form of a holder, a clamp or a catch device. Preferably the at least one interior component is fastened to the frame element by means of a fastening device which is formed or arranged on a fastening module provided on the frame element.

The at least one insulation package is on the other hand fastened to the frame element preferably by means of a fastening device, which is designed so as to fasten the insulation package to the frame element in a mechanically releasable manner. When installing a structural group consisting of a frame element and an insulating package on the aircraft structure, the insulation package arranged between the frame element and the aircraft structure in the installed state of the structural group might be compressed by means of a rib of the aircraft structure in the region of a contact surface of the insulation package with the rib of the aircraft structure. The insulation material is however sufficiently elastic so that damage of the insulation package is avoided. If necessary the insulation package may also be provided with corresponding recesses for accommodating the rib or another component of the aircraft structure.

Finally, the method according to the invention may envisage the fastening of at least one interior component as well as at least one insulation package to the frame element before attaching the frame element to the aircraft structure.

BRIEF DESCRIPTION OF THE DRAWINGS

A preferred embodiment of the invention is described in more detail hereinafter with the aid of the accompanying diagrammatic drawings, in which.

DETAILED DESCRIPTION OF THE DRAWINGS

Figure 1:
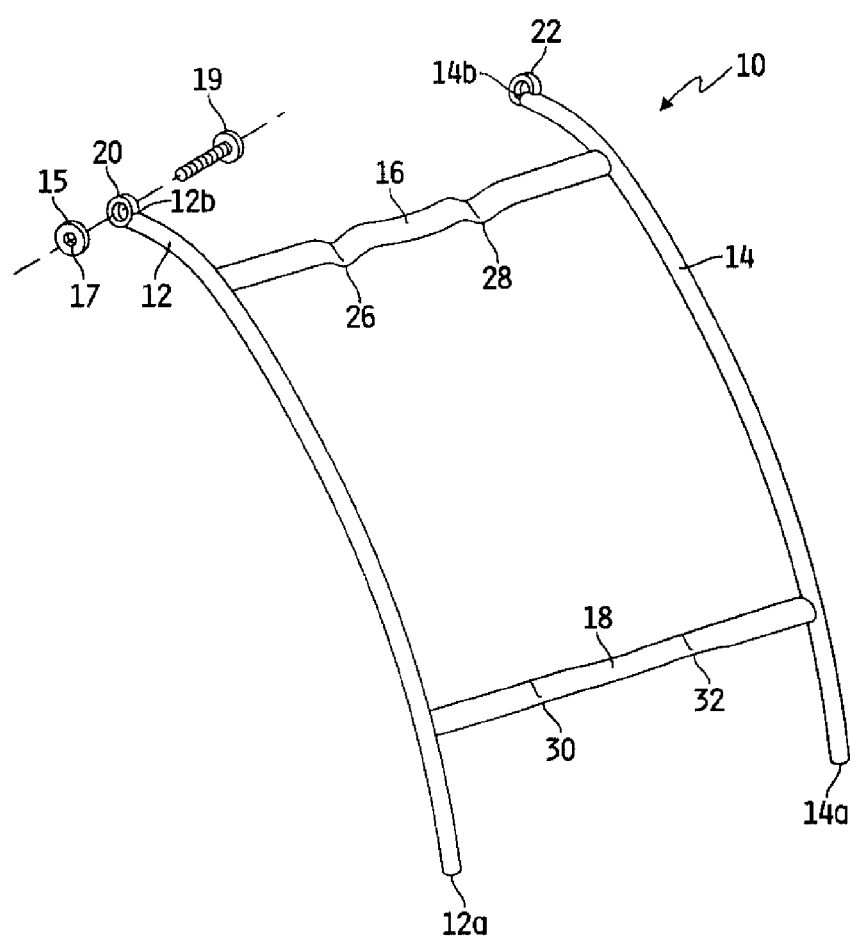
FIG. 1 shows a first embodiment of a frame element according to the invention.

FIG. 1 shows a frame element 10 formed of aluminium, which comprises two curved and hollow cylindrically formed longitudinal struts 12, 14 arranged parallel to one another, as well as two connecting struts 16, 18 extending parallel to one another between the longitudinal struts 12, 14. Air inlet connections 12a, 14a of the hollow cylindrically formed longitudinal struts 12, 14 are connectable to an air outlet duct of an aircraft air-conditioning unit (not shown), while air outlet connections 12b, 14b of the hollow cylindrically formed longitudinal struts 12, 14 of the frame element 10 are connectable to an air outlet opening (not shown) terminating in a cabin region of an aircraft.

A clip-type force application device 20, 22 is provided on each longitudinal strut 12, 14 of the frame element 10, which however is formed in such a way on the longitudinal struts 12, 14 of the frame element 10 that it does not interfere in a connection of the air outlet connections 12b, 14b of the longitudinal struts 12, 14 to the air outlet opening terminating in the cabin region of the aircraft. In addition each connecting strut 16, 18 of the frame element 10 is provided with two recesses 26, 28, 30, 32.

Figure 2:
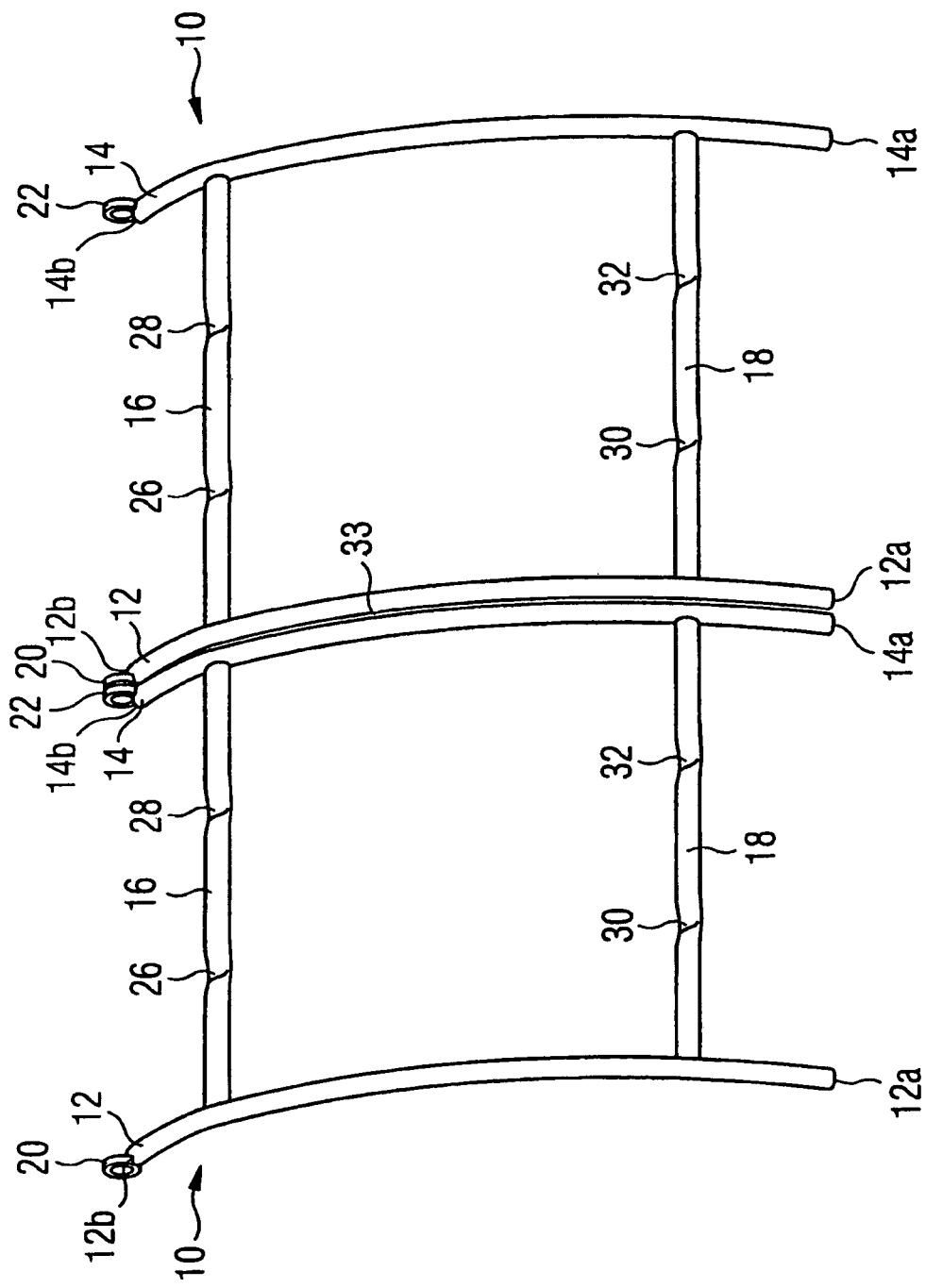
FIG. 2 shows a structural group comprising two frame elements as shown in FIG. 1.

A plurality of frame elements 10 can form a structural group, such a group comprising two frame elements 10 being shown in FIG. 2. A gap covering 33 is provided between adjacent frame elements 10 of the aircraft component installation system 46.

Figure 3:
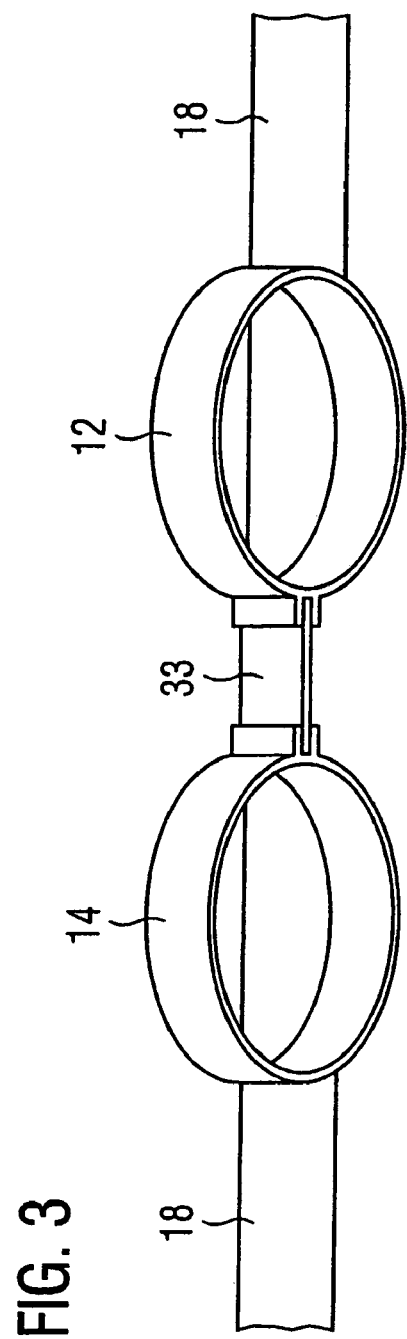
FIG. 3 shows a detailed view of a cross-section of the longitudinal struts of two frame elements according to the invention, as shown in FIG. 2.

FIG. 3 shows a detailed view of the structural group with two frame elements 10 illustrated in FIG. 2, in which the hollow cylindrical cross-section of the longitudinal struts 12, 14 of the frame elements 10 is illustrated once more. As can be seen from FIG. 3, the longitudinal struts 12, 14 of the frame element 10 have a closed circular cross-section.

Figure 4:
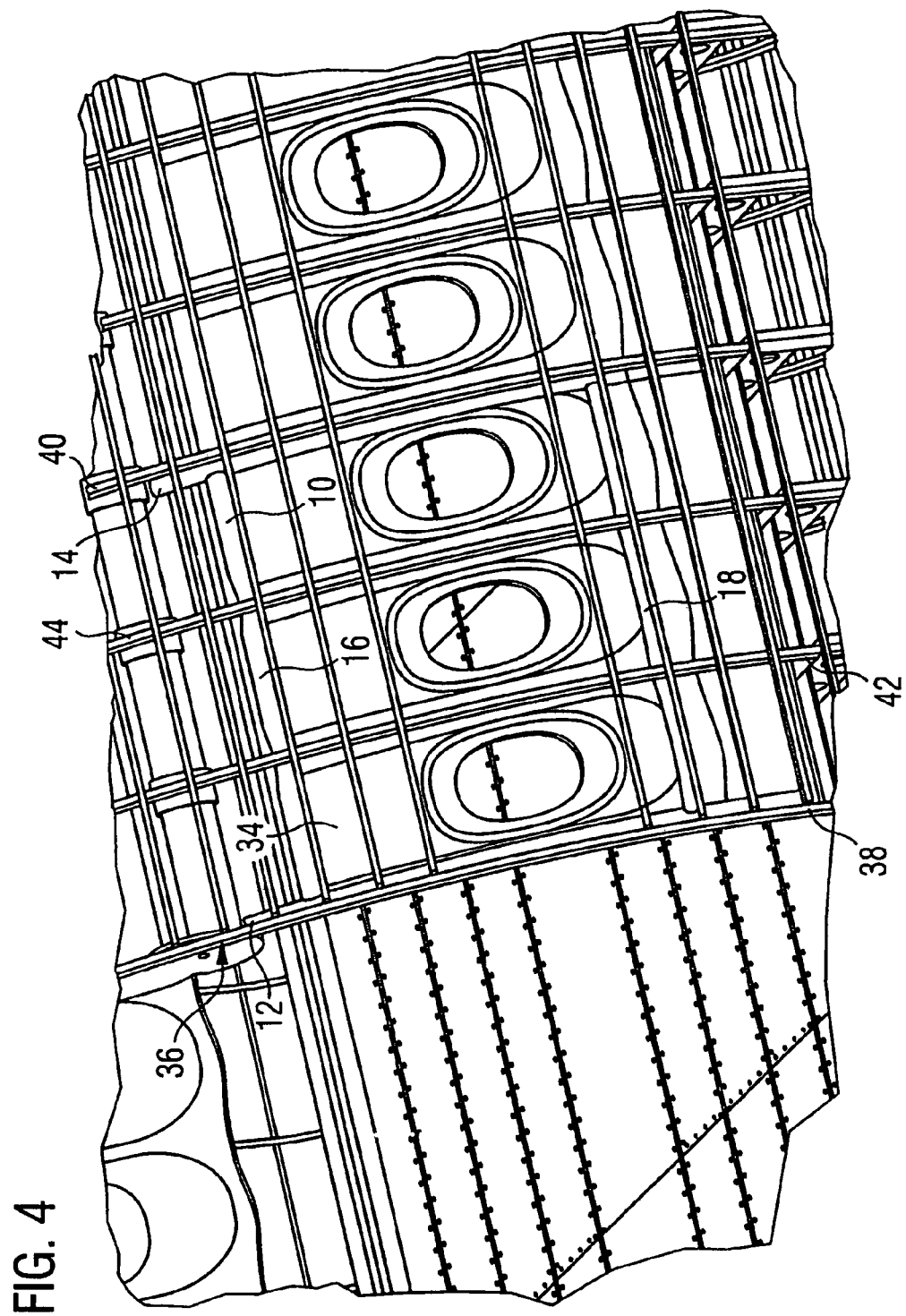
FIG. 4 shows the first embodiment of the frame element according to the invention with interior components fastened thereon in the installed state.

The frame element 10 in addition includes a fastening device, not shown in the figures, which serves to fasten an aircraft interior component 34, recognisable in FIG. 4, to the frame element 10. A holder, a clamp or a catch device may serve as a fastening device for fastening the interior structural component 34 to the frame element 10. Alternatively it is however also possible to screw or rivet the interior component 34 to the frame element 10, in which case corresponding holes, if necessary provided with a thread, are then formed in the interior component 34 and/or the frame element 10. In the embodiment shown in FIG. 4 the interior structural part 34 secured to the frame element 10 is a side panel. It is however also possible to attach other aircraft interior structural components, such as for example dado panels, ceiling panels, door frame structural parts, light strips etc., to the frame element 10.

By means of the force application devices 20, 22 formed on the longitudinal struts 12, 14 of the frame element 10 the frame element 10 can be secured to an aircraft structure 36 on a side of the aircraft structure 36 facing towards an interior space of an aircraft. For this purpose a screw is guided through each force application device 20, 22 formed on the longitudinal struts 12, 14 of the frame element 10 and is screwed in a hole, provided with a thread, formed in a rib 38, 40 of the aircraft structure 36.

The fastening of the frame element 10 to the aircraft structure 36 is carried out by means of shock mounts not shown in FIG. 4, i.e. bearings of a vibration-damping material that ensure a shock-free fastening of the frame element 10 to the aircraft structure 36. The shock mounts, e.g., shock mount 15 illustrated in FIG. 1, which consist of a rubber-elastic material, each are provided with a through opening, e.g., through opening 17 illustrated in FIG. 1, through which can be passed the screws, e.g., screw 19 illustrated in FIG. 1, serving to secure the structural group consisting of the frame element 10 and the interior structural part 34, to the aircraft structure 36. An acoustic decoupling of the frame element 10 and thus of the interior structural part 34 from the aircraft structure 36 can be achieved by means of the shock mounts.

As can be seen from FIG. 4, the curvature of the longitudinal struts 12, 14 of the frame element 10 matches at least in sections a curvature of the ribs 38, 40 of the aircraft structure 36, so that the longitudinal struts 12, 14 of the frame element 10 in the installed state of the frame element 10 extend section-wise substantially parallel to the ribs 38, 40. Ribs 42, 44 lying between the ribs 38, 40 of the aircraft structure 36 are accommodated in the recesses 26, 28, 30, 32 provided on the connecting struts 16, 18 of the frame element 10, so that the ribs 42, 44 do not interfere in the fastening of the frame element 10 to the aircraft structure 36.

Figure 5:
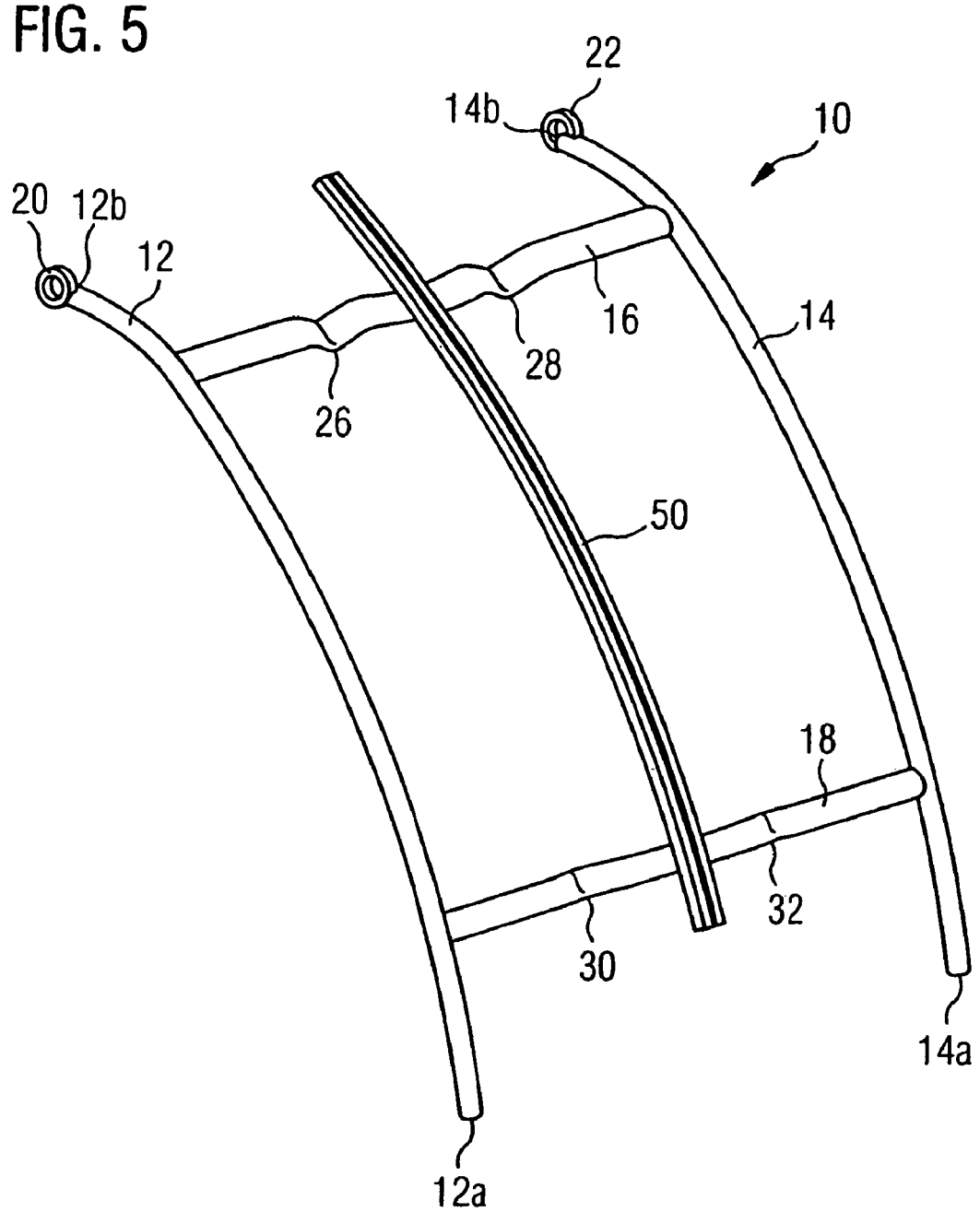
FIG. 5 shows the first embodiment of the frame element according to the invention with a fastening module for fastening an interior component to the frame element.

FIG. 5 shows a frame element 10, which comprises a fastening module 50 designed in the form of a curved strut and attached to the frame element 10. A fastening device, not shown in FIG. 5, for fastening an aircraft interior component to the fastening module 50 and thus to the frame element 10 is formed on the fastening module 50. As discussed in connection with FIG. 4, the fastening device may be designed in the form of a holder, a clamp or a catch device. As an alternative to this, the interior structural part may however also be connected by screwing or riveting to the fastening module 50 and thus to the frame element 10.

The fastening module 50 is matched as regards its shape and size and also as regards the shape and arrangement of the fastening device provided on the fastening module 50, to the interior structural part to be attached to the frame element 10. In addition the curvature of the fastening module 50 is matched to a curvature of ribs of an aircraft structure, so that the frame element 10 can be fastened without any problem to the aircraft structure on a side of the aircraft structure facing towards an interior space of an aircraft.

Figure 6:
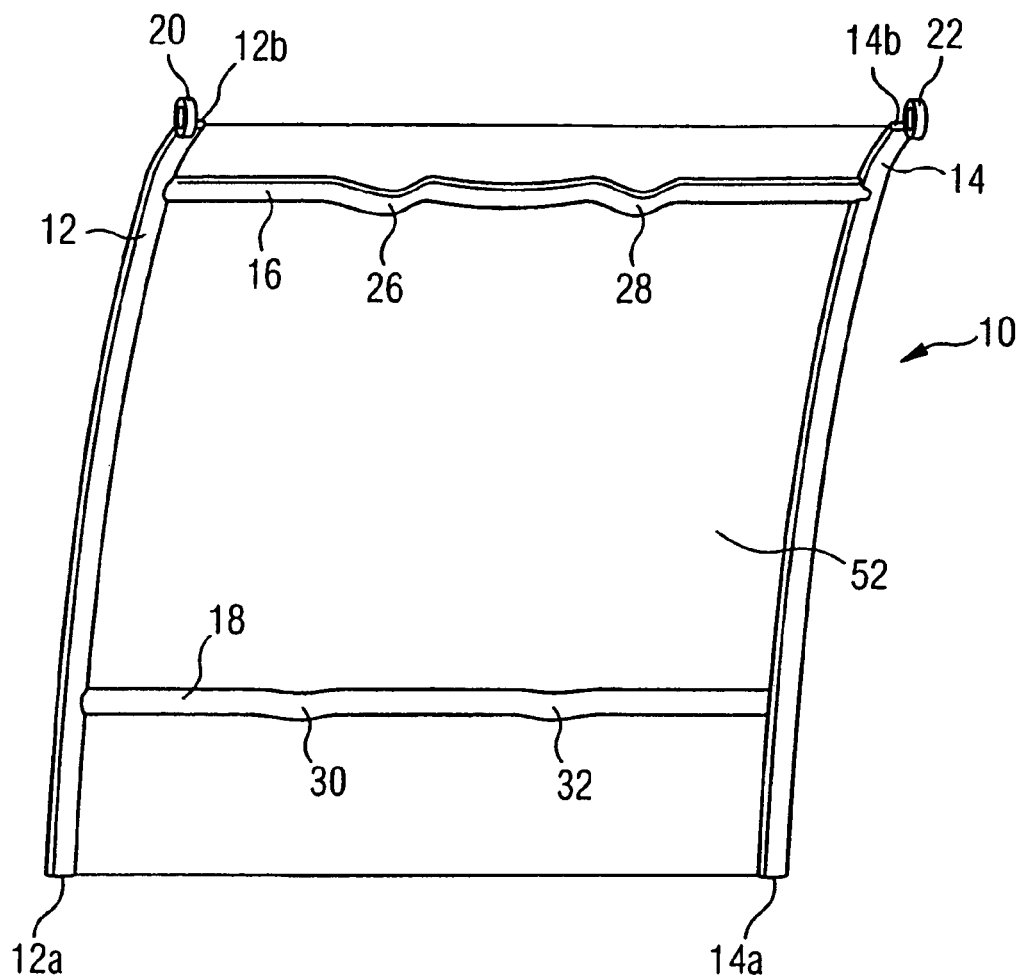
FIG. 6 shows the first embodiment of the frame element according to the invention with an insulation package fastened thereon.

The frame element 10 shown in FIG. 6 comprises, in addition to the fastening device for fastening an aircraft interior structural part, also a further fastening device, not shown in FIG. 6, for the mechanically releasable fastening of an insulation package 52 forming a part of an aircraft secondary insulation, to the frame element 10. The frame element 10, the fastening device for fastening an aircraft interior structural part and the further fastening device for fastening the insulation package 52 are designed and arranged so that the interior component can be fastened on a first side of the frame element 10 facing towards an interior space of an aircraft in the mounted state of the frame element 10, while the insulation package 52 can be attached to a second side of the frame element 10 facing away from the interior space of the aircraft in the mounted state of the frame element 10.

In the mounted state of a structural group consisting of the frame element 10, the interior component and the insulation package 52, the insulation package 52 is arranged between the frame element 10 and an aircraft structure, so that the insulation package 52 might be compressed in the region of the contact surface of the insulation package 52 with a rib or another component of the aircraft structure. The material of the insulation package 52 is however sufficiently elastic so that the insulation package 52 does not suffer any damage. Alternatively, the insulation package 52 can also be provided with corresponding recesses for accommodation of a rib or another component of the aircraft structure.

Figure 7:
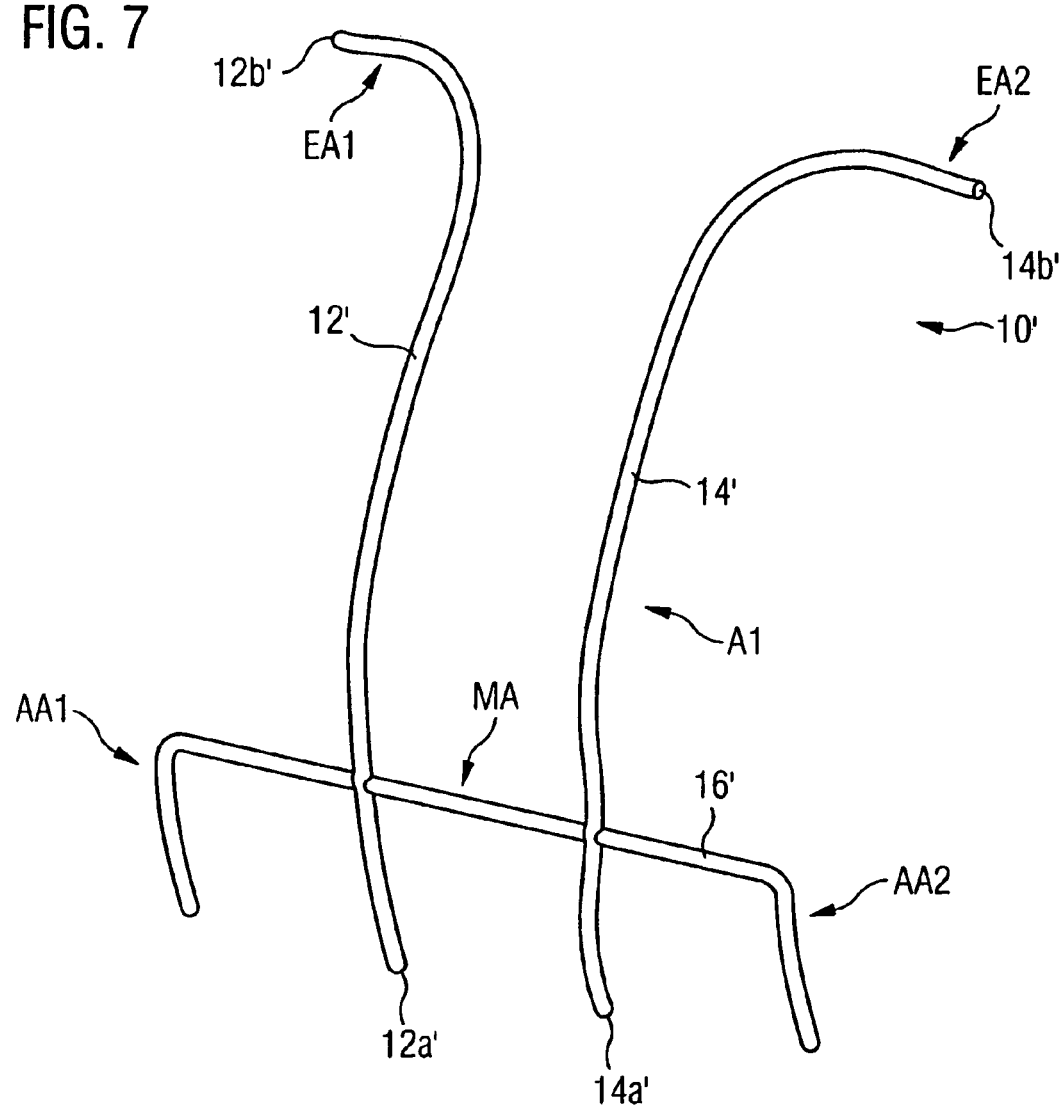
FIG. 7 shows a second embodiment of a frame element according to the invention.

FIG. 7 shows a second embodiment of a frame element 10' made of aluminium. The frame element 10' comprises two hollow cylindrically formed longitudinal struts 12', 14', which extend substantially parallel to one another in a first section A1. In a similar way to the frame element 10 shown in FIGS. 1 to 6, a curvature of the longitudinal struts 12', 14' in the first section A1 matches the curvature of the ribs of the aircraft structure. In contrast to the frame element 10 shown in FIGS. 1 to 6, the hollow cylindrically formed longitudinal struts 12', 14' of the frame element 10' according to FIG. 7 include however end sections EA1, EA2 each curved outwardly by an angle of ca. 90°, so that each hollow cylindrically formed longitudinal strut 12', 14' is substantially L-shaped.

Air inlet connections 12a', 14a' of the hollow cylindrically formed longitudinal struts 12', 14' are connectable to an air outlet duct of an aircraft air-conditioning unit (not shown), while air outlet connections 12b', 14b' of the hollow cylindrically formed longitudinal struts 12', 14' of the frame element 10' are connectable to an air outlet opening (not shown) terminating in a cabin region of an aircraft.

Furthermore the frame element 10' comprises a connecting strut 16'. A middle section MA of the connecting strut 16' extends between the hollow cylindrically formed longitudinal struts 12', 14'. In addition the connecting strut 16' includes two outer sections AA1, AA2, each extending outwardly from the hollow cylindrically formed longitudinal struts 12', 14', which outer sections first of all form an extension of the middle section MA of the connecting strut 16' in a part adjoining the longitudinal struts 12', 14', but are then bent by an angle of ca. 90° and extend substantially parallel to the hollow cylindrically formed longitudinal struts 12', 14'. The connecting strut 16' of the frame element 10' is thus substantially C-shaped.

Like the frame element 10, the frame element 10' also includes a fastening device, not shown in FIG. 7, which serves to fasten an aircraft interior component to the frame element 10'. In addition a further fastening device, not illustrated in FIG. 7, is provided so as to fasten an insulation package forming a part of an aircraft secondary insulation, to the frame element 10' in a mechanically releasable manner.

Figure 8:
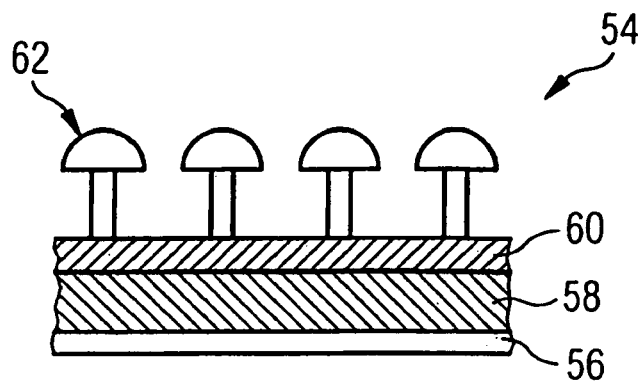
FIG. 8 shows a first embodiment of a fastening device for fastening the insulation package to the frame element.
Figure 9:
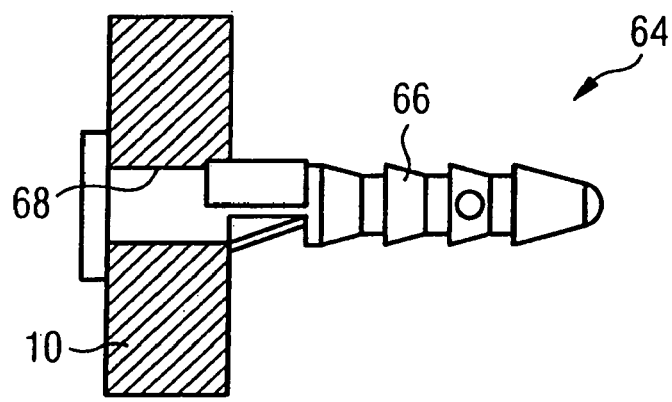
FIG. 9 shows a second embodiment of a fastening device for fastening the insulation package to the frame element.
Figure 10:
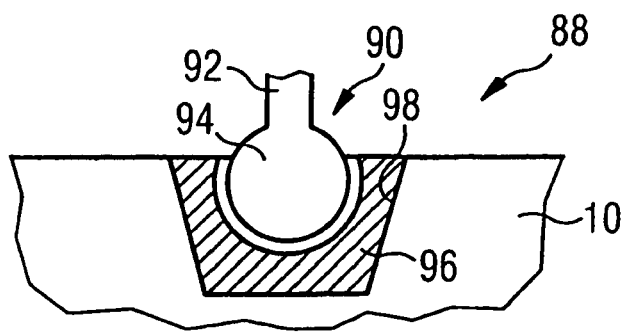
FIG. 10 shows a third embodiment of a fastening device for fastening the insulation package to the frame element.

FIGS. 8 to 10 show various embodiments of a further fastening device for fastening the insulation package 52 to a frame element 10, 10'.

In FIG. 8 the further fastening device is in the form of a mushroom-type strip 54, which includes a protective paper layer 56, a self-adhesive neoprene foam layer 58 arranged over the protective paper layer 56, as well as a polyolefin layer 60 arranged over the neoprene foam layer 58. A plurality of mushroom-type devices 62 extends in a substantially perpendicular direction from the polyolefin layer 60. In order to fasten the mushroom-type strip 54 to the frame element 10, 10' the protective paper layer 56 is removed, so that the mushroom-type strip 54 can be bonded by means of the self-adhesive neoprene foam layer 58 to the frame element 10. The insulation package 52 can finally be fastened in a mechanically releasable manner to the frame element 10, 10' via the mushroom-type devices 62 engaging in the manner of hooks in the insulating material of the insulation package 52.

FIG. 9 shows a further fastening device designed in the form of a Christmastree-type fastening device 64. The Christmastree-type fastening device 64 comprises a plurality of Christmastree-type devices 66, which are accommodated in bores 68 formed in the frame element 10 and extend in a substantially perpendicular direction from the frame element 10, 10'. The insulation package 52 can be fastened in a mechanically releasable manner to the frame element 10, 10' via the Christmastree-type devices 66 engaging in the manner of hooks in the insulating material of the insulation package 52.

A further fastening device designed in the form of an expansion-type device, and not shown in the figures, includes a plurality of retaining buttons, which each comprise a head as well as a base extending from the head. The base of the retaining buttons is designed so as to be accommodated in a recess formed in the frame element 10, 10'. In order to fasten a retaining button on the frame element 10 the base of the retaining button is introduced into the recess formed in the frame element 10, 10'. The retaining button is then turned in 15° steps until lugs formed on the base engage with complementary devices that are provided in the recess formed in the frame element 10, 10'. Finally, a closure cylinder arranged on the head of the retaining button is pressed downwardly until it engages with a closure pin arranged in the interior of the head. The insulation package 52 can finally be fastened to the frame element 10, 10' by means of screws, which co-operate with threads formed in the heads of the retaining buttons.

Finally, FIG. 10 shows a further fastening device designed in the shape of a spherical fastening device 88. The spherical fastening device 88 includes a plurality of spherical holders 90, each of which includes a cylindrical bolt 92. A sphere 94 is arranged at one end of the bolt 92, the sphere being designed so as to be accommodated in a recess 98 lined with a rubber insert 96 and formed in the frame element 10, 10'. In order to fasten the insulation package 52 to the frame element 10, 10' the insulating material of the insulation package 52 is clamped between a holder 100 formed on an opposite end of the bolt 92 and the surface of the frame element 10, 10'.

In the installation of the frame element 10, 10' a desired interior component 34 is first of all fastened to the frame element 10, 10'. An insulation package 52 forming a part of an aircraft secondary insulation is then attached in a mechanically releasable manner to the frame element 10, 10'.

The structural group consisting of at least one interior component 34, at least one frame element 10, 10' and at least one insulation package 52 is then screwed to the aircraft structure 36. The fastening is effected via shock mounts in order to acousticly decouple the structural group consisting of the interior component 34, the frame element 10, 10' and the insulation package 52 from the aircraft structure 36.

Finally, the air inlet connections 12a, 14a, 12a', 14a' of the hollow cylindrically formed longitudinal struts 12, 14, 12', 14' of the frame element 10, 10' are connected to the air outlet duct of the aircraft air-conditioning system. The air outlet connections 12b, 14b, 12b', 14b' of the hollow cylindrically formed longitudinal struts 12, 14, 12', 14' of the frame element 10, 10' are on the other hand connected to the air outlet opening terminating in the cabin region of the aircraft. The frame element 10, 10' thus performs a double function, namely that of providing the riser ducts for the aircraft air-conditioning system and at the same time serving as a carrier element for various interior components 34, i.e. interior components 34 of various shapes and sizes.

The invention claimed is:

1. A frame element for use in an aircraft air-conditioning system, the frame element comprising two cylindrically formed struts and at least one connecting strut extending at least in sections between the two cylindrically formed struts, wherein the frame element is attachable as an integral unit to an aircraft structure, wherein at least one of the two cylindrically formed struts is formed at least in sections as a hollow cylinder, and wherein an air inlet connection of the at least section-wise hollow cylindrically formed strut of the frame element is connected to an air outlet duct of the aircraft air-conditioning system, and an air outlet connection of the at least section-wise hollow cylindrically formed strut of the frame element is connected to an air outlet opening terminating in a cabin region of the aircraft.

2. The frame element according to claim 1, characterised in that the at least section-wise hollow cylindrically formed strut has a closed loop cross-section.

3. The frame element according to claim 1, characterised in that the frame element is attachable to the aircraft structure with the two cylindrically formed struts oriented substantially perpendicular to a floor of the aircraft structure.

4. The frame element according to claim 1, characterised in that the connecting strut of the frame element is provided with at least one recess indention, which accommodates a rib of the aircraft structure after the attachment of the frame element to the aircraft structure.

5. The frame element according to claim 1, characterised in that on each of the two cylindrically formed struts of the frame element there is formed at least one force application device for attaching the frame element to the aircraft structure.

6. The frame element according to claim 1, characterised in that the frame element is attachable to the aircraft structure via shock mounts.

7. The frame element according to claim 1, characterised in that the frame element comprises at least one fastening device for fastening at least one aircraft interior component or at least one insulation package to the frame element.

8. The frame element according to claim 7, characterised in that the at least one fastening device for fastening the at least one aircraft interior component to the frame element is in the form of a holder, a clamp or a catch device.

9. The frame element according to claim 7, characterised in that the at least one fastening device for fastening the at least one insulation package to the frame element is designed so as to fasten the insulation package in a mechanically detachable manner to the frame element.

10. The frame element according to claim 7, characterised in that the frame element includes a fastening module, on which is formed or arranged the at least one fastening device for fastening at least one aircraft interior component.

11. The frame element according to claim 7, characterised in that the frame element further comprises at least one further fastening device for fastening at least one insulation package or at least one interior component to the frame element.

12. An aircraft air-conditioning system with an aircraft air-conditioning unit including an air outlet duct, an air outlet opening terminating in a cabin region of an aircraft, and at least one frame element according to claim 1, wherein the air inlet connection of the at least section-wise hollow cylindrically formed strut of the frame element is connected to the air outlet duct of the aircraft air-conditioning unit, and the air outlet connection of the at least section-wise hollow cylindrically formed strut of the frame element is connected to the air outlet opening terminating in the cabin region of the aircraft.

13. The aircraft air-conditioning system according to claim 12, characterised by a plurality of frame elements.

* * * * *